US012330698B2

(12) United States Patent
Swar et al.

(10) Patent No.: US 12,330,698 B2
(45) Date of Patent: Jun. 17, 2025

(54) END OF TRAIN DEVICE WITH INTEGRATED ANTENNA

(71) Applicant: Transportation IP Holdings, LLC, Norwalk, CT (US)

(72) Inventors: Padam Dhoj Swar, Clarksburg, MD (US); Benjamin L. Henniges, Mt. Airy, MD (US); Michael B. Colson, Woodbine, MD (US); Carl L. Haas, Walkersville, MD (US); David Andrew Gloyd, Ellicott City, MD (US)

(73) Assignee: Transportation IP Holdings, LLC, Norwalk, CT (US)

( * ) Notice: Subject to any disclaimer, the term of this patent is extended or adjusted under 35 U.S.C. 154(b) by 36 days.

(21) Appl. No.: 18/133,391

(22) Filed: Apr. 11, 2023

(65) Prior Publication Data

US 2023/0242163 A1 Aug. 3, 2023

Related U.S. Application Data

(63) Continuation-in-part of application No. 17/313,888, filed on May 6, 2021, now Pat. No. 11,716,111, and a continuation-in-part of application No. 16/164,338, filed on Oct. 18, 2018, now Pat. No. 11,654,943.

(51) Int. Cl.
*B61L 15/00* (2006.01)
*H01Q 1/32* (2006.01)

(52) U.S. Cl.
CPC ....... *B61L 15/0054* (2013.01); *B61L 15/0027* (2013.01); *H01Q 1/3233* (2013.01)

(58) Field of Classification Search
CPC ............ B61L 15/0054; B61L 15/0027; H01Q 1/3233; H01Q 9/18; H01Q 1/42; H01Q 9/32; H01Q 21/28
USPC .......................................................... 246/122
See application file for complete search history.

(56) References Cited

U.S. PATENT DOCUMENTS 5,235,849 A 8/1993 Egerton
5,267,473 A 12/1993 Bezos et al.
5,650,713 A 7/1997 Takeuchi et al.
(Continued)

FOREIGN PATENT DOCUMENTS

CA 2972412 A1 8/2016
CN 101170279 A 4/2008
(Continued)

OTHER PUBLICATIONS

Examination Report No. 2 for corresponding AU Application No. 2022201616 dated May 29, 2023.
(Continued)

*Primary Examiner* — Tanmay K Shah
(74) *Attorney, Agent, or Firm* — K&L Gates LLP

(57) ABSTRACT

A device adapted for attachment to a coupler of a trailing railcar of a train includes an enclosure defining an internal compartment, a port adapted for connection to an air brake hose receiving air from a brake pipe of the train, a handle extending from the enclosure, a communication device disposed within the internal compartment of the enclosure, and at least one antenna connected to the communication device and extending at least partially through the internal compartment of the enclosure and into an internal cavity of the handle.

18 Claims, 9 Drawing Sheets

(56) References Cited

U.S. PATENT DOCUMENTS

| | | | | | |
|---|---|---|---|---|---|
| 5,841,403 | A * | 11/1998 | West | H01Q 1/243 343/702 |
| 5,873,638 | A | 2/1999 | Bezos | |
| 5,960,592 | A | 10/1999 | Lilienthal, II et al. | |
| 6,081,769 | A | 6/2000 | Curtis | |
| 6,227,625 | B1 | 5/2001 | Gaughan | |
| 6,803,748 | B2 | 10/2004 | Peter | |
| 7,109,928 | B1 | 9/2006 | Thiele | |
| 7,468,564 | B2 | 12/2008 | Crisafulli | |
| 7,769,509 | B2 | 8/2010 | Gaughan et al. | |
| 7,979,173 | B2 | 7/2011 | Breed | |
| 8,102,077 | B2 | 1/2012 | Neher | |
| 8,299,645 | B2 | 10/2012 | Muchow et al. | |
| 9,065,370 | B2 | 6/2015 | Ito et al. | |
| 9,083,861 | B2 | 7/2015 | Haas et al. | |
| 9,393,977 | B2 | 7/2016 | Kramer et al. | |
| 10,457,281 | B2 | 10/2019 | Brooks et al. | |
| 2003/0071467 | A1 | 4/2003 | Calley et al. | |
| 2006/0272539 | A1 | 12/2006 | Clavel | |
| 2010/0123314 | A1 | 5/2010 | Menke | |
| 2010/0130124 | A1* | 5/2010 | Teeter | B61L 15/0027 455/15 |
| 2011/0079402 | A1* | 4/2011 | Darby | E21B 33/072 166/385 |
| 2011/0183605 | A1 | 7/2011 | Smith, Jr. et al. | |
| 2011/0251742 | A1 | 10/2011 | Haas et al. | |
| 2011/0260831 | A1* | 10/2011 | Ieda | B60R 25/246 340/5.64 |
| 2011/0315766 | A1* | 12/2011 | Phillips | G06Q 10/087 235/385 |
| 2012/0191265 | A1 | 7/2012 | Keir | |
| 2013/0147676 | A1* | 6/2013 | Chang | H01Q 1/521 343/841 |
| 2014/0361540 | A1 | 12/2014 | Knnight | |
| 2015/0105967 | A1 | 4/2015 | Skipp et al. | |
| 2016/0036574 | A1* | 2/2016 | Rose | B61L 3/227 370/329 |
| 2016/0096537 | A1* | 4/2016 | Bartek | B61L 15/0027 246/124 |
| 2016/0118786 | A1 | 4/2016 | Zhu et al. | |
| 2016/0208781 | A1 | 7/2016 | Kjaer et al. | |
| 2016/0290318 | A1 | 10/2016 | Muik | |
| 2017/0088153 | A1* | 3/2017 | Fernandes | B61L 15/009 |
| 2017/0101054 | A1 | 4/2017 | Dusane | |
| 2018/0041151 | A1 | 2/2018 | Turpin | |
| 2018/0166776 | A1 | 6/2018 | Ziegler et al. | |
| 2018/0210439 | A1 | 7/2018 | Brooks et al. | |
| 2019/0140701 | A1* | 5/2019 | Greason | G06K 7/10336 |
| 2019/0366998 | A1* | 12/2019 | Bolte | B60T 13/665 |
| 2020/0001857 | A1 | 1/2020 | Naylor et al. | |
| 2020/0107141 | A1 | 4/2020 | Kvist et al. | |
| 2022/0059935 | A1 | 2/2022 | Zhang et al. | |

FOREIGN PATENT DOCUMENTS

| | | | |
|---|---|---|---|
| CN | 10308615 | A | 5/2013 |
| DE | 102011086609 | B4 | 3/2022 |
| WO | 2019133824 | A1 | 7/2019 |

OTHER PUBLICATIONS

Office Action for corresponding CA Application No. 3113624, dated Mar. 2, 2024.

Examination Report No. 1 for corresponding AU Application No. 2022201616 dated Mar. 9, 2022.

Search Report mailed Jun. 22, 2022 for corresponding IN Application No. 202114014004.

* cited by examiner

END OF TRAIN DEVICE WITH INTEGRATED ANTENNA

CROSS-REFERENCE TO RELATED APPLICATIONS

This application is a continuation-in-part of U.S. patent application Ser. No. 16/164,338 filed on Oct. 18, 2018 and U.S. patent application Ser. No. 17/313,888 filed on May 6, 2021, the entire disclosures of which are incorporated herein by reference.

BACKGROUND

Technical Field

The present inventive subject matter relates to the field of rail car end of train devices and, in particular, an end of train device having an integrated antenna. The present inventive subject matter also relates to a rail car system having an end of train device with an integrated antenna.

Description of Art

Rail car transportation of goods and people is a ubiquitous and essential part of modern economies. Train systems typically include one or more locomotives driving a series of freight cars and, optionally, any number of specialized cars. The train system including the locomotives and the cars coupled thereto may be referred to as a consist. The brake system of a train typically includes a brake pipe extending along the length of the consist and branching off at each rail car to supply pressure for activating the brake. In some train arrangements, a monitoring device such as an end of train (hereinafter "EOT") device, can be attached to the final car in the train and receives pressure from the brake pipe. The EOT device typically includes a sensor for measuring the pressure at the brake pipe and a transceiver for communicating the brake pipe pressure to a control unit in the locomotive. As such, an operator or control unit in the locomotive is able to monitor the state of brake pipe pressure at the rear of the consist and can deduce from the best brake pipe pressure if the EOT device has detached or if a car in the consist has derailed. The resulting loss in brake pipe pressure can be used to stop the train.

EOT devices typically communicate with the locomotive wirelessly via an antenna. To keep pace with freight companies increasing length of the consist to include more and more cars, the EOT devices must be capable of communication over a greater distance. Moreover, as more wireless communication devices are used, the level of interference may grow. Therefore, a need to use different (e.g., lower) frequencies for wireless communication continues to grow. One solution to improve communication is to increase the length of the antenna mounted to the EOT device. However, such length increases often require external mounting of the antennas, which unfavorably subjects the antennas to harsh environmental conditions including dust, weather, vibration, and impact. Another technical problem with EOTs is the limitation of the antenna performance. When used with vehicle systems that include plural vehicles, the EOT may be coupled with the last vehicle of the vehicle system and may not have a direct line of sight to a lead vehicle of the vehicle system. Optionally, naturally and/or man-made obstacles may stand between the EOT and the lead vehicle. Additionally, the size of the EOT limits the size of an antenna that may be used within the EOT. The EOT may need to communicate data signals with the lead vehicle, however data signals communicated by the antenna that fits within the EOT may be unable to reach the lead vehicle, or the quality of the data signals may be compromised.

It may be desirable to have a system and method that differs from those that are currently available.

BRIEF DESCRIPTION

In accordance with one embodiment, an end-of-train (EOT) device may have an enclosure having walls that enclose an interior volume; a communication device disposed in the interior volume of the enclosure; and an antenna coupled with the communication device and configured to wirelessly communicate signals with the communication device, the antenna may be coupled to one or more of inner surfaces of the walls of the enclosure that face the interior volume, embedded within one or more of the walls of the enclosure, or embedded within an exterior handle of the enclosure.

In accordance with one embodiment, a device can be adapted for attachment to a coupler of a trailing railcar of a train, the device can have an enclosure defining an internal compartment; a port may be adapted for connection to an air brake hose receiving air from a brake pipe of the train; a communication device may be disposed within the internal compartment of the enclosure; and at least one antenna can be connected to the communication device and disposed in at least a portion of the enclosure or in at least a portion of the air brake hose connected to the port.

In accordance with one embodiment, a method may include wirelessly communicating data signals from one or more transceivers of a wireless communication device of a vehicle monitoring device, the vehicle monitoring device can be configured to be disposed within a housing operably coupled with a vehicle system, the wireless communication device can be configured to wirelessly communicate the data signals with a controller disposed outside of the housing; and transmitting data signals on discrete frequency ranges using the one or more transceivers based at least in part on a frequency selected by the controller disposed outside of the housing.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
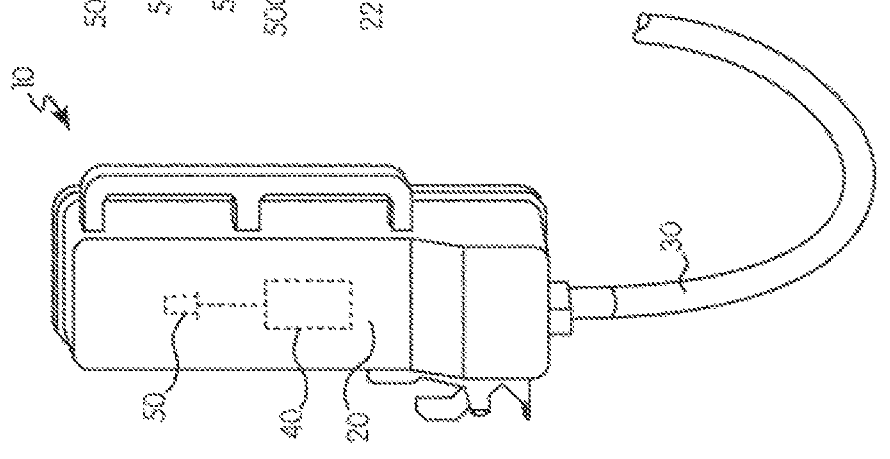
FIG. 1 (Prior Art)
FIG. 1 is a perspective view of an EOT device known in the art.

As used herein, spatial or directional terms, such as "inner", "outer", "left", "right", "up", "down", "horizontal", "vertical", "lateral", "forward", "backward", "rearward", and the like, relate to the inventive subject matter as it is shown in the drawing figures. However, it is to be understood that the inventive subject matter can assume various alternative orientations and, accordingly, such terms are not to be considered as limiting. It is also to be understood that the specific apparatuses and configurations illustrated in the attached drawings and described in the following specification are simply exemplary embodiments of the inventive subject matter. Hence, specific dimensions and other physical characteristics related to the embodiments disclosed herein are not to be considered as limiting, unless otherwise indicated.

As used herein, the term "at least one of" is synonymous with "one or more of". For example, the phrase "at least one of A, B, and C" means any one of A, B, and C, or any combination of any two or more of A, B, and C. For example, "at least one of A, B, and C" includes one or more of A alone; or one or more B alone; or one or more of C alone; or one or more of A and one or more of B; or one or more of A and one or more of C; or one or more of B and one or more of C; or one or more of all of A, B, and C. Similarly, as used herein, the term "at least two of" is synonymous with "two or more of". For example, the phrase "at least two of D, E, and F" means any combination of any two or more of D, E, and F. For example, "at least two of D, E, and F" includes one or more of D and one or more of E; or one or more of D and one or more of F; or one or more of E and one or more of F; or one or more of all of D, E, and F.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some aspects, a message may refer to a network packet (e.g., a data packet, and/or the like) that includes data. It will be appreciated that numerous other arrangements are possible.

As used herein, the term "diversity antenna" and derivatives thereof may refer to one antenna in a system of more than one antennas. The diversity antenna may be used as a supplement to a primary antenna of the system to improve the quality and reliability of the communication from the primary antenna to a receiver.

FIG. 1 shows a typical EOT device 10 known in the art. The known EOT device 10 includes a hollow enclosure 20 adapted for mounting to a rail car. The enclosure is adapted to receive a hose 30 connected to the brake pipe of a train system. The enclosure houses a radio 40 and an antenna 50 for communicating with a transceiver.

Embodiments of the present inventive subject matter are generally directed to EOT devices having antennas that are completely or partially internal to the EOT devices. In one example, the antennas can be coupled with inner surfaces of the enclosures of the EOT devices. The antennas may be embedded within the material forming the walls of the enclosure of the EOT. The antennas can be embedded within the material forming handles of the enclosure. In one example, the antennas can be coupled and/or embedded within hoses or other conduits of the EOT. Optionally, one segment of an antenna can be coupled with the inner surface of the enclosure, another segment of the same antenna can be embedded within the walls of the enclosure, and/or another segment of the same antenna can be embedded within a handle of the enclosure. Referring now to FIGS. 2-9, the EOT devices may generally include an enclosure 200 housing one or more communication devices 300, such as one or more transmitters and/or transceivers. The enclosure may have an interior volume, the interior volume may be at least partially hollow, with the one or more communication devices housed in an interior cavity defined by the enclosure. The enclosure defines a port 210 adapted to receive a conduit 400, such as an air brake hose, in communication with a brake pipe of a train system.

The one or more communication devices are in communication with one or more antennas 500 configured to transmit and/or receive a signal from the one or more communication devices to or from a remote transceiver. Each of the one or more communication devices may be in communication with one of the one or more antennas, and/or each of the one or more communication devices may be in communication with two or more of the one or more antennas, and/or each of the one more antennas may be in communication with two or more of the one or more communication devices.

The enclosure may include or define one or more handles 220 extending from one or more sidewalls 222 of the enclosure. Each handle may include one more gripping portions 224 spaced apart from the corresponding sidewall of the enclosure by one or more struts 226. The sidewalls can have an inner or interior surface on the interior volume of the enclosure and an exterior surface on the exterior of the enclosure.

Figure 10:
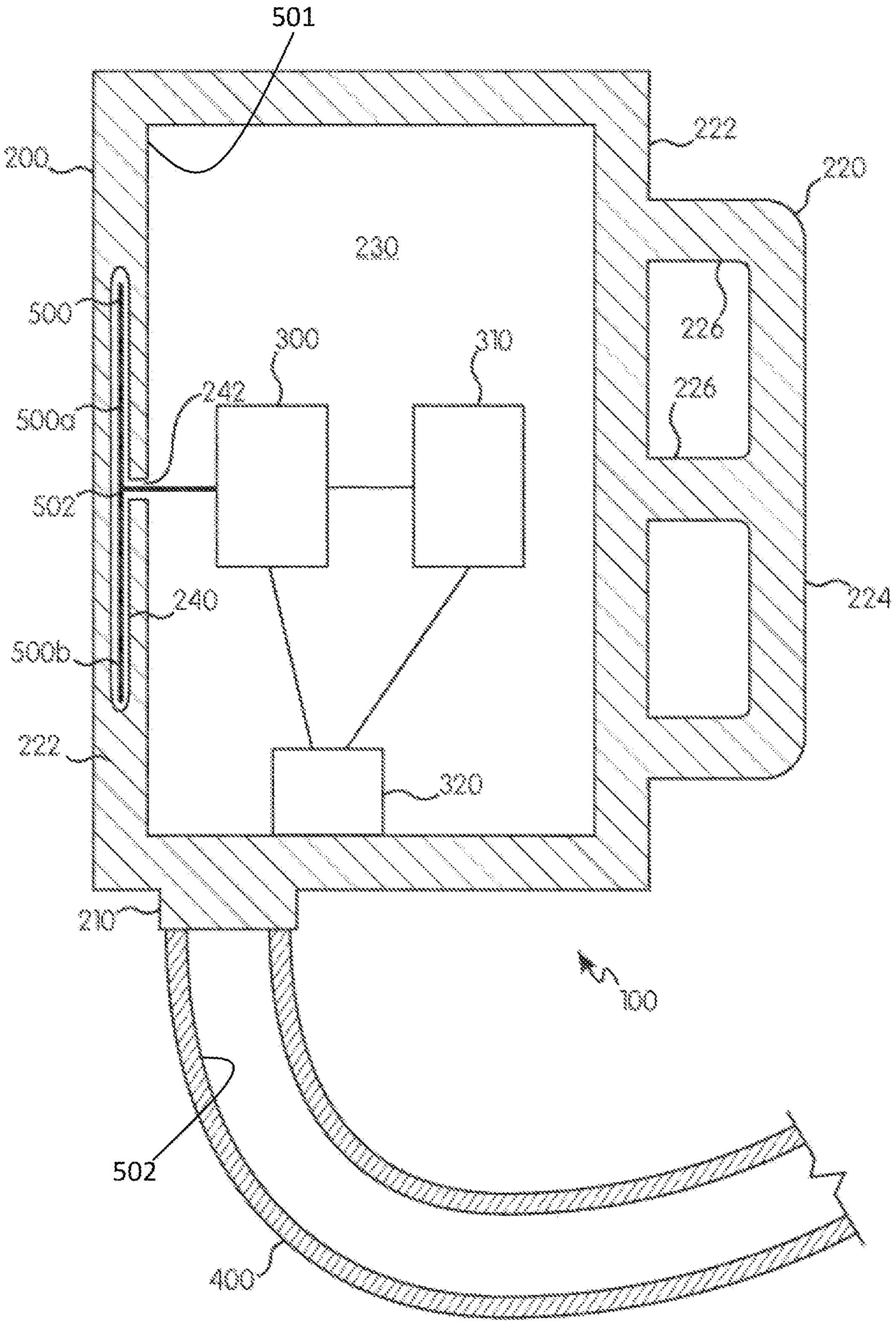
FIG. 10 is a cross-section view of the EOT device of FIG. 2.
Figure 11:
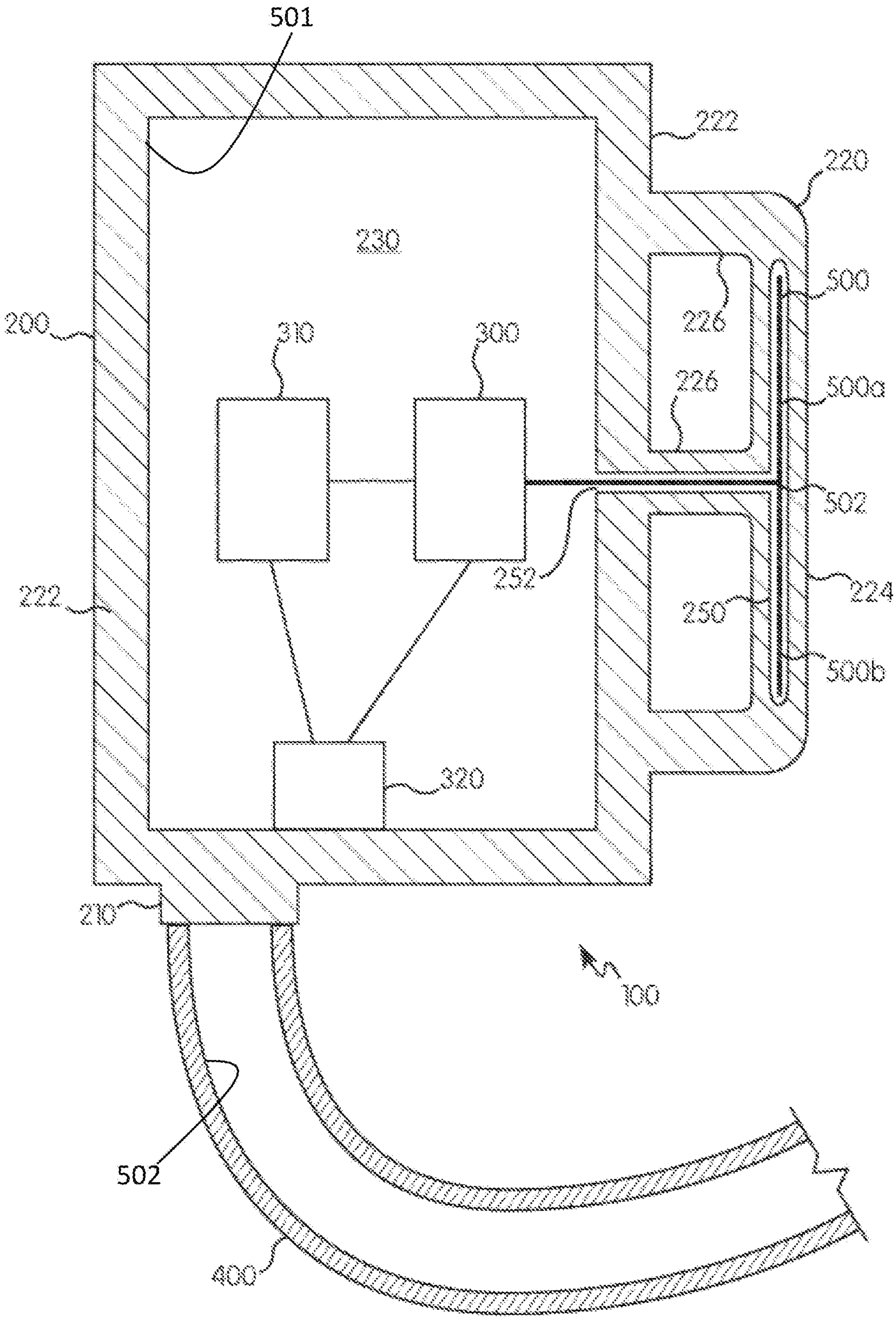
FIG. 11 is a cross-section view of the EOT device of FIG. 5.
Figure 12:
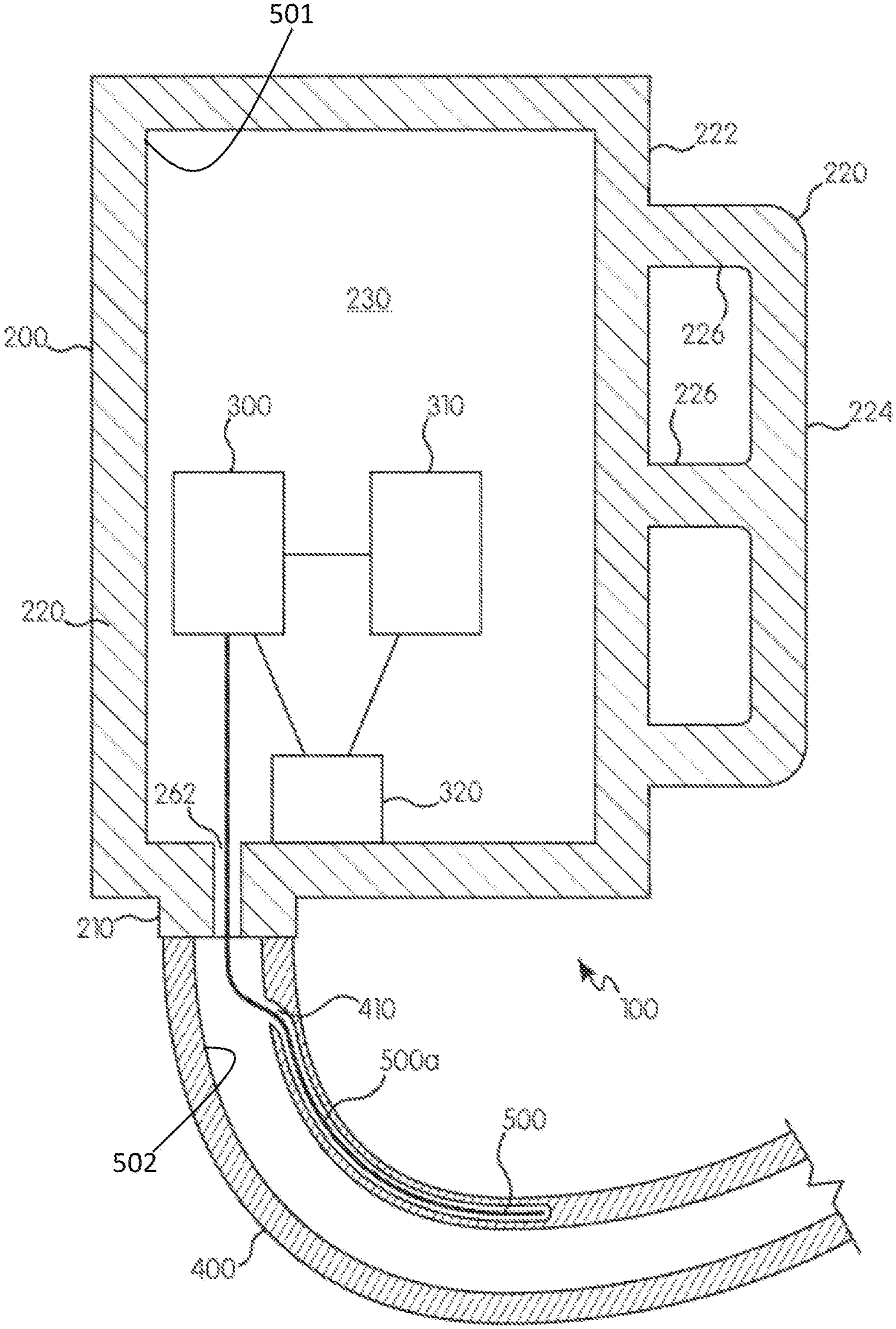
FIG. 12 is a cross-section view of the EOT device of FIG. 3.

As shown in the embodiments of FIGS. 2-9, the one or more antennas may be arranged in various configurations with respect to the enclosure, the one or more handles, and the air brake hose. Additionally, each of the one or more antennas may be of monopole, dipole, or other configuration. Moreover, the one or more antennas may include any combination of primary, diversity, and/or other communication types. In one example, the antenna may be attached to an interior surface 501 of the enclosure, as shown in FIGS. 10-12. The antenna may be attached to an interior surface 502 of the conduit or hose. In some examples, the antenna can be coupled to the interior surface of the enclosure with an adhesive or tape. In yet other examples, as will described herein, the antenna can be integrated into, or formed within, one or more of the walls and/or structure of the enclosure or the hose. Epoxy potting methods may be used to couple the antenna to the interior surfaces. In one embodiment, the antenna may be completely enclosed or sealed within enclosure. The antenna may be a pair of antennas that can be located on opposing interior surfaces of the enclosure. In one example, the antenna pair may face each other on the interior surfaces of the enclosure. In other examples, the antenna pair may be oriented within the enclosure to provide optimal operating characteristics. In one example, the antenna may be coupled to one interior surface of the EOT. In other examples, the antenna can be coupled to several interior surfaces of the EOT. The coupling of the antenna to the EOT may include, but is not limited to, adhesive, glue, fasteners, interference fit of antenna into the structure of the enclosure, or other means of physical attachment to the EOT.

Figure 2:
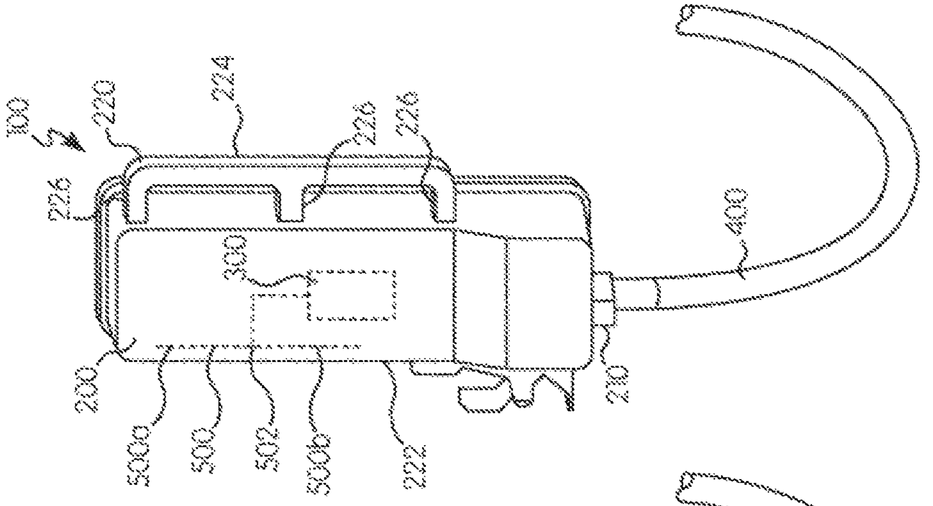
FIG. 2 is a perspective view of one embodiment of an EOT device.

In the embodiment of the EOT device shown in FIG. 2, the one or more antennas include(s) a single antenna in communication with a single communication device and coupled in one or more of the sidewalls of the enclosure. The single antenna is shown as a dipole antenna having a first conductor rod 500*a* and a second conductor rod 500*b* attached at a junction 502. The first and second conductor rods of the antenna are protected from the external environment by being within the one or more sidewalls of the enclosure. In one example, the conductor rod(s) are coupled to the interior surface of the enclosure. The conductor rods may each extend as long as is practical, dictated by the size of the one or more sidewalls of the enclosure, or as long as is required to achieve a desired range of communication. Though not shown, the conductor rods may extend uninterrupted through and/or across multiple of the one or more sidewalls of the enclosure. In one example, the antenna is longer than a longest interior dimension of the enclosure. The antenna may have a length from a base or proximal end to an opposite terminal or distal end. This length may be longer can fit inside the enclosure. For example, the interior volume of the enclosure may have a longest dimension between opposing or other pairs of walls. In one example, his longest dimension may be shorter than the length of the antenna. As a result, the antenna may need to be bent, curved, wrapped, coiled, or the like, as the antenna is coupled to the inner surfaces of the enclosure. In some examples, the antenna may need to be adhered to or embedded within several of the walls of the enclosure.

Figure 3:
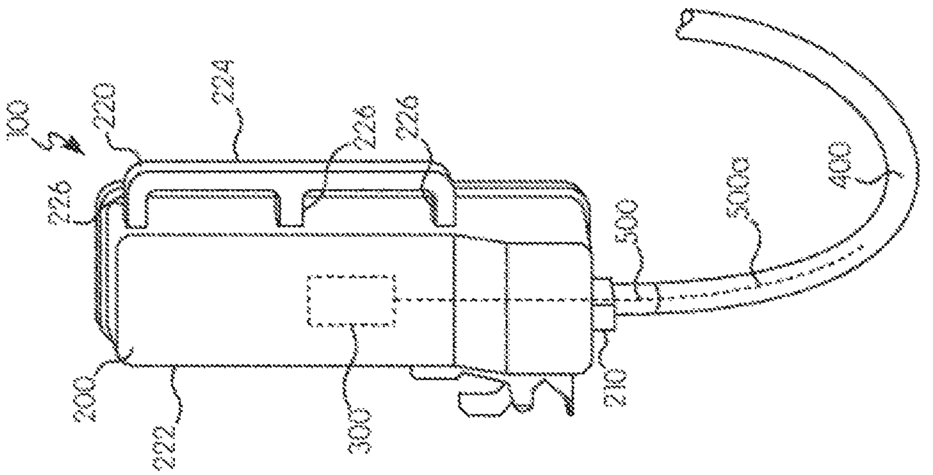
FIG. 3 is a perspective view of another embodiment an EOT device.

In the embodiment of the EOT device shown in FIG. 3, the one or more antennas include(s) a single antenna in communication with a single communication device and embedded in the air brake hose. In some embodiments, the single antenna may be integrally formed with the air brake hose and passed through the port 210 of the enclosure when the air brake hose is attached to the EOT device. The single antenna is shown as a monopole antenna having a single conductor rod. The conductor rod of the antenna is protected from the external environment by being embedded within the air brake hose. The conductor rod may extend as long as is practical, dictated by the length of the air brake hose, or as long as is required to achieve a desired range of communication. In one example, the antenna may need to be bent, curved, wrapped, coiled, or the like, as the antenna is coupled to, or routed within, the inner surfaces of the conduit or hose.

Figure 4:
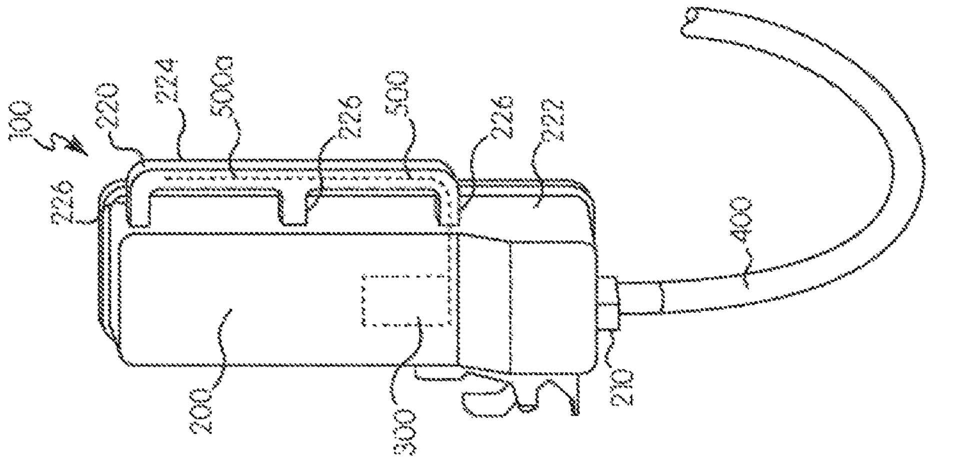
FIG. 4 is a perspective view of another embodiment an EOT device.

In the embodiment of the EOT device shown in FIG. 4, the one or more antennas include(s) a single antenna embedded in one of the handles of the enclosure. The single antenna is in communication with a single communication device such as a transceiver and passes through one of the sidewalls of the enclosure, through an internal cavity of one of the struts, and into the gripping portion of the handle. The single antenna is shown as a monopole antenna having a single conductor rod 500*a*. The single conductor rod 500*a* of the antenna is protected from the external environment by being embedded within the handle of the enclosure. The conductor rods may each extend as long as is practical, dictated by the size of the handle of the enclosure, or as long as is required to achieve a desired range of communication.

Figure 5:
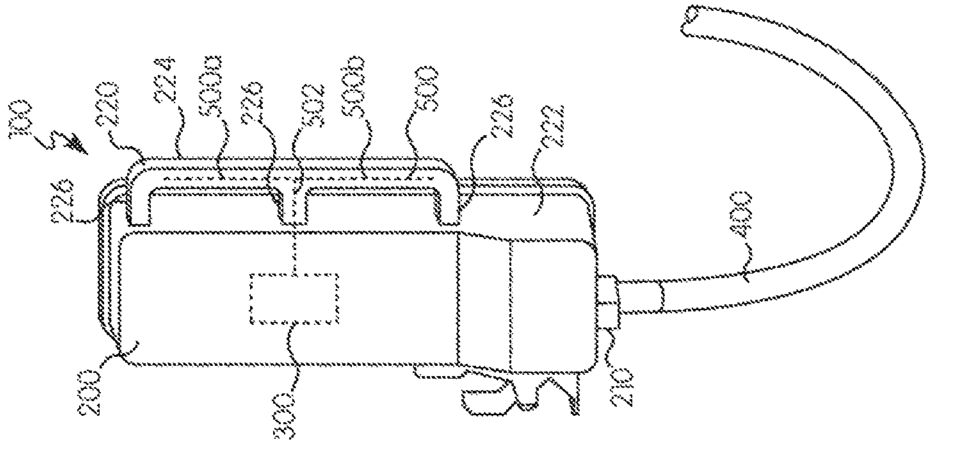
FIG. 5 is a perspective view of another embodiment an EOT device.

The embodiment of the EOT device shown in FIG. 5 can be similar to the embodiment shown in FIG. 4, except that the single antenna is shown as a dipole antenna having a first conductor rod 500*a* and a second conductor rod 500*b* attached at a junction 502. The single antenna passes through the strut located generally near a midpoint of the handle to equalize the length of the first and second conductor rods extending in opposite directions in the handle. Other than the difference noted above, the embodiment of FIG. 5 may be similar to the embodiment of FIG. 4.

Figure 6:
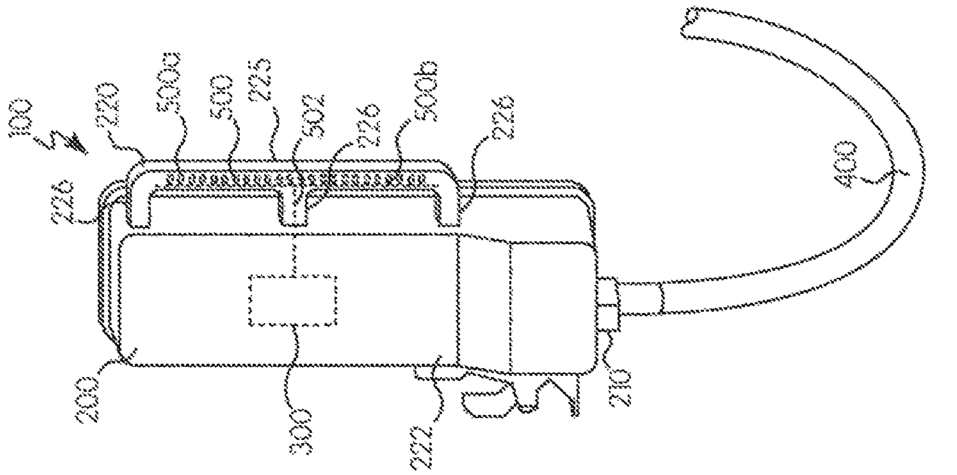
FIG. 6 is a perspective view of an EOT device according to another embodiment an embodiment.

The embodiment of the EOT device shown in FIG. 6 can be substantially similar to the embodiment of FIG. 5, except that the first and second conductor rods 500*a*, 500*b* of the single antenna 500 are in a helical dipole configuration.

Figure 7:
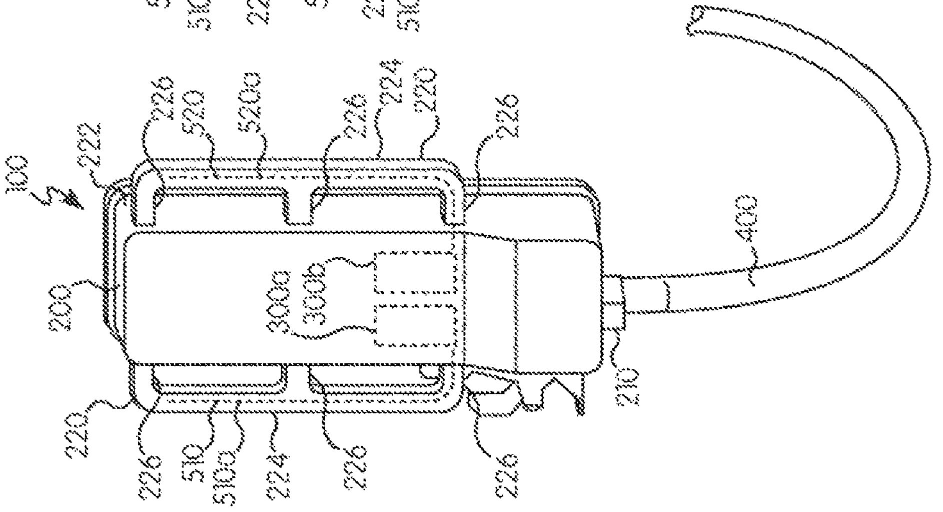
FIG. 7 is a perspective view of an EOT device according to another embodiment an embodiment.

The embodiment of the EOT device 100 shown in FIG. 7 can be similar to the embodiment shown in FIG. 4 except that the one or more antenna(s) include(s) a first antenna 510 and a second antenna 520. The first and second antennas are, respectively, in communication with a first transmitter 300*a* and a second transmitter 300*b*. Each of the first and second antennas passes through one of the sidewalls of the enclosure, through an internal cavity of one of the struts, and into the gripping portion of one of the handles. The first and second antennas are shown as monopole antennas, each having a single conductor rod 510*a*, 510*b*. The first antenna may serve as a primary antenna while the second antenna may serve as a diversity antenna. The single conductor rods of the first and second antennas are protected from the external environment by being embedded within the handles of the enclosure. The conductor rods may each extend as long as is practical, dictated by the size of the handles of the enclosure, or as long as is required to achieve a desired range of communication. The antenna may need to be bent, curved, wrapped, coiled, or the like, as it is attached or formed into the enclosure, handle, and/or hose.

Figure 8:
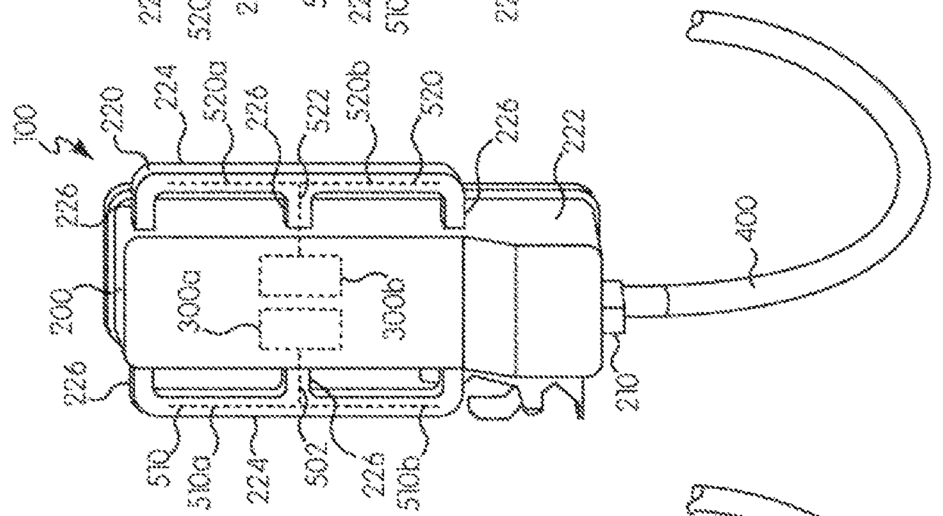
FIG. 8 is a perspective view of another embodiment an EOT device.

The embodiment shown in FIG. 8 can be similar to the embodiment shown in FIG. 7, except that each of the first and second antennas are shown as dipole antennas. The first antenna has a first conductor rod 510*a* and a second conductor rod 510*b* attached at a junction 512. The second antenna has a first conductor rod 520*a* and a second conductor rod 520*b* attached at a junction 522. The first and second antennas each pass through the strut located generally near a midpoint of the handles to equalize the length of the first conductor rods and the second conductor rods extending in opposite directions in the respective handles.

Other than the difference noted above, the embodiment of FIG. 8 may be similar to the embodiment of FIG. 7

Figure 9:
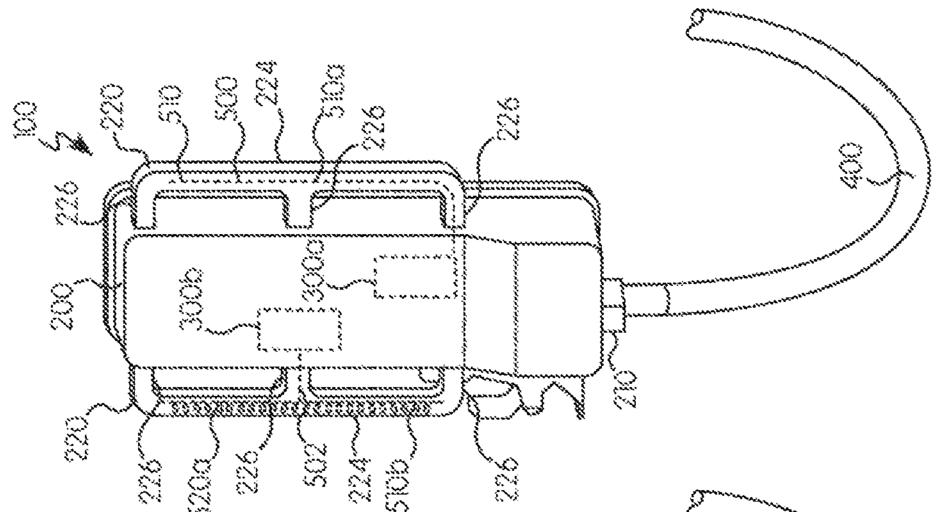
FIG. 9 is a perspective view of yet another embodiment an EOT device.

In the embodiment shown in FIG. 9, the one or more antennas may include(s) a first antenna 510 and a second antenna 520. The first and second antennas are, respectively, in communication with a first transmitter or transceiver 300*a* and a second transmitter or transceiver 300*b*. Each of the first and second antennas passes through one of the sidewalls of the enclosure, through an internal cavity of one of the struts, and into the gripping portion of one of the handles. The first antenna is shown as a monopole antenna having a single conductor rod 510*a*. The second antenna is shown as a helical dipole antenna having first and second conductor rods 520*a*, 520*b* connected at a junction 522. The first antenna may serve as a primary antenna, while the second antenna may serve as a diversity antenna. The conductor rods of the first and second antennas are protected from the external environmental by being embedded within the handles of the enclosure. The conductor rods may each extend as long as is practical, dictated by the size of the handles of the enclosure, or as long as is required to achieve a desired range of communication. The antennas may need to be bent, curved, wrapped, coiled, or the like, as it is attached or formed into the enclosure, handle, and/or hose. In one example, the first antenna and the second antenna can be substantially similar in length. The first antenna may be longer than the second antenna. The second antenna may be longer than the first antenna. In one example, the first antenna may be routed in the enclosure and through the handle and the second antenna may be routed in the enclosure and through the hose to accommodate the respective lengths of the first and second antenna.

The embodiments shown in FIGS. 2-9 are intended as exemplary only, and various combinations and modifications to the embodiments shown may be appreciated by those skilled in the art and are to be considered within the scope of the present disclosure. For example, any of the one or more antennas which are shown in FIGS. 2-9 as monopole antennas may be substituted with a dipole or other configuration of antenna, and vice versa. Similarly, any of the embodiments of FIGS. 2-9 showing a primary antenna and a diversity antenna may be modified such that the roles of the primary and diversity antennas are switched. Moreover, the present disclosure is not limited to primary and diversity antennas, and other types of antennas may be readily added to or substituted for any of the one or more antennas shown in FIGS. 2-9. Further, each of the one or more antennas may be embedded in more than one of the sidewalls of the enclosure, the handles of the enclosure, and the air brake hose. The one or more antennas may additionally or alternatively be embedded in one or more other components of the EOT device without departing from the scope of the present disclosure. The one or more antennas may be supported in the enclosure, the handles of the enclosure, and the air brake hose with adhesive or other fastening means without departing from the scope of the present disclosure.

Additionally, any of the embodiments shown in FIGS. 2-9 may be combined with a EOT device 10 as shown in FIG. 1. In particular, the EOT device of any of FIGS. 2-9 may be modified to include an antenna 50 of the EOT device of FIG. 1 in communication with the at least one communication device such as a transmitter and/or transceiver.

Referring now to FIGS. 10-12, cross-section views of various embodiments of the EOT device 100 are shown to illustrate the arrangement of the one or more antennas 500. The cross-section view of FIG. 10 generally corresponds to the embodiment of the EOT device 100 shown in FIG. 2. As shown in FIG. 10, the sidewalls of the enclosure define an internal compartment 230 in which the communication device is housed. The transmitter can be in communication with the one or more antennas, at least one processor 310, and a pressure sensor 320. The pressure sensor may be mounted in the internal compartment in fluid communication with the port 210. The pressure sensor is adapted to measure the air pressure received at the EOT device via the air brake hose. The pressure sensor can transmit a signal to the at least one processor, which processes the signal and/or transmits the signal to transmitter. In some embodiments of the EOT device, any of the communication devices, the at least one processor, and the pressure sensor may be integrated into a single processing unit.

With continued reference to FIG. 10, the antenna is at least partially disposed in one or more sidewalls of the enclosure. In particular, the one or more sidewalls define a cavity 240 in which the conducting rods of the antenna are disposed. The cavity may be connected to the internal compartment of the enclosure via a channel 242 also defined in the one or more sidewalls. The antenna may pass through the channel for connection to the communication device within the internal compartment. In some embodiments, the cavity and the channel may be machined or otherwise formed in the one or more sidewalls prior to the antenna being disposed in the cavity and the channel. The antenna may then be inserted into the cavity via the channel during assembly of the EOT device. In other embodiments, the antenna may be integrally formed into the one or more sidewalls during a molding or other forming process for manufacturing the enclosure, such that the cavity and the channel are defined by and/or around the antenna. In some embodiments, the antenna 500 may be integrally molded into the one or more sidewalls such that cavity and the channel are defined as the material forming the one or more sidewalls flows against and encases the antenna during the molding process. The antenna may thus be in direct contact with the material of the one or more sidewalls, such that no gap is present between the antenna and the material of the one or more sidewalls. In such embodiments, the cavity and the channel may thus be entirely occupied by the antenna. In one example, the cavity and channel can be formed on the inner surface of the enclosure as a groove or a recess such that the antenna is partially exposed to the inner volume of the enclosure. The antenna may be adhered to the cavity with glue. In one example, the antenna may be coupled to the cavity using an epoxy that fills the cavity. In one example, the antenna may be adhered to the inner surface and routed into the cavity such that the antenna traverses from the inner volume of the enclosure into the material of the sidewall, the handle, and/or the hose. In one example, the antenna may be adhered to the inner surface, the groove and/or channel, and the cavity such that the antenna occupies space within the inner volume of the cavity located in the sidewall, the handle and/or the hose. In one example, the cavity, groove, and/or channel can be located on one or more of the sidewalls of the enclosure, the handle, and/or the hose. In some examples, the antenna may be routed from one side of the enclosure to an opposite side of the enclosure, thereby traversing the hollow volume of the enclosure.

The cross-section view of FIG. 11 generally corresponds to the embodiment of the EOT device shown in FIG. 5. The arrangement of the communication device, the at least one processor, and the pressure sensor within the internal compartment of the enclosure is substantially as described above with reference to FIG. 10. The antenna s may be at least partially disposed in one or more of the handles of the enclosure. In particular, the one or more handles define a cavity 250 in which the conducting rods of the antenna are disposed. The cavity may be located in the gripping portion of the handle, the struts of the handle, or a combination thereof. The cavity may be connected to the internal compartment of the enclosure via a channel 252 also defined in one or more of the struts. The antenna may pass through the channel for connection to the communication devices such as the transmitter and/or transceiver within the internal compartment. In some embodiments, the cavity and the channel may be machined or otherwise formed in the one or more handles prior to the antenna being disposed in the cavity and the channel. The antenna may then be inserted into the cavity via the channel during assembly of the EOT device. In other embodiments, the antenna may be integrally formed into the one or more handles during a molding or other forming process for manufacturing the handles such that the cavity and the channel are defined by and/or around the antenna. In some embodiments, the antenna may be integrally molded into the one or more handles such that cavity and the channel may be defined as the material forming the one or more handles flows against and encases the antenna during the molding process. The antenna is thus in direct contact with the material of the one or more handles, such that no gap is present between the antenna and the material of the one or more handles. In such embodiments, the cavity and the channel may thus be entirely occupied by the antenna.

The cross-section view of FIG. 12 generally corresponds to the embodiment of the EOT device shown in FIG. 3. The arrangement of the communication device, the at least one processor, and the pressure sensor within the internal compartment of the enclosure can be substantially as described above with reference to FIG. 10. The antenna can be at least partially disposed in the air brake hose. In particular, a flexible wall of the air brake hose defines a cavity 410 in which the conductor rod of the antenna is disposed. The cavity may extend from an end of the air brake hose connected to the port of the enclosure. The port may further define a channel 262 connecting to cavity of the air brake hose with the internal compartment of the enclosure. The antenna may pass through the channel for connection to the communication device such as the transmitter within the internal compartment. In some embodiments, the cavity may be formed in the air brake hose prior to the antenna being inserted into the cavity, i.e., during manufacturing of the air brake hose. The antenna may then be inserted into the cavity via the channel during assembly of the EOT device. In other embodiments, the antenna may be integrally formed into the air brake hose during a molding, braiding, wrapping, or other forming process of the air brake hose such that the cavity is defined around the antenna.

In some embodiments, the antenna may be integrally molded into the air brake hose such that cavity is defined as the material forming the air brake hose flows against and encases the antenna during the molding process. The antenna is thus in direct contact with the material of the air brake hose, such that no gap is present between the antenna and the material of the air brake hose. In other embodiments, the antenna may be integrally formed with the air brake hose by braiding or winding the material of the air brake hose around the antenna. Again, the antenna may thus be in direct contact with the material of the air brake hose, such that no gap may be present between the antenna and the material of the air brake hose. In such embodiments, the cavity and the channel may thus be entirely occupied by the antenna. Similarly, the channel of the port may be integrally molded into the enclosure as the same manner as discussed above with respect to the channel of the sidewalls and the channel of the handle.

FIGS. 10-12 are intended to be illustrative of various embodiments of EOT devices but are not to be construed as limiting. The cavity and the channel of the one or more sidewalls may be readily adjusted based on the size, type, and configuration of the one or more antennas. For example, the location of the channel shown in FIG. 10 is generally located centrally in sidewall to balance the respective lengths of the first and second conducting rods of the dipole antenna. However, the channel may be readily located toward an end of the sidewall in an embodiment having a monopole antenna with only a single conducting rod in order to maximize the length of the conducting rod. Similarly, with respect to FIG. 11, the channel of the handle may be relocated from the central strut as shown to the lower or upper strut to better accommodate a monopole antenna. Moreover, in embodiments of the EOT device having multiple antennas, a plurality of the cavities and the channels in the sidewalls, the cavities, and the channels in the handles, and/or the cavity in the air brake hose, may be implemented in any combination to accommodate the multiple antennas. In one example, the antenna can be coupled with the inner surfaces of the walls of the enclosure inside the interior volume of the enclosure. In one example, the enclosure can be sized such that a longest interior dimension of the interior volume of the enclosure may be shorter than a length of the antenna. In one example, the antenna may extend from the interior volume of the enclosure into the exterior handle of the enclosure. In another example, the EOT device may have a brake conduit coupled with the enclosure, wherein the antenna can also extend into the brake conduit. One skilled in the art will readily appreciate these and similar variations which are understood to be within the scope of the present disclosure.

Figure 13:
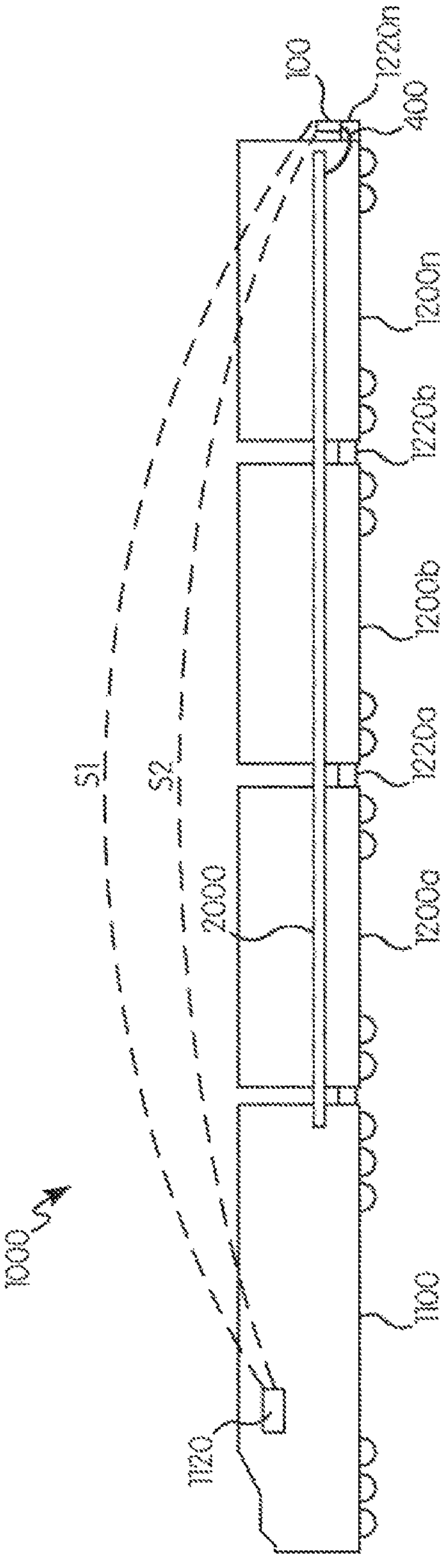
FIG. 13 is a schematic of a train system having an EOT device in accordance with one embodiment.

Referring now to FIG. 13, embodiments of the EOT devices as described with reference to FIGS. 1-12 may implemented into a train system 1000 including a consist of at least one locomotive 1100 and a plurality of rail cars 1200*a*-1200*n* connected in series via a coupler 1220*a*-1220*n* of each of the rail cars 1200*a*-1200*n*. A brake pipe 2000 may extend along the length of the consist and may have a branch connection at each of the rail cars to supply air brake pressure to each rail car. The brake pipe is shown schematically in FIG. 13 but may include a plurality of rigid sections and solid sections along the length of the consist. The EOT device according to any of the embodiments described above may be affixed to the coupler of the trailing rail car and connected to the air brake hose branching from the brake pipe. The locomotive may include a receiver 1120 in wireless communication with the EOT device via the one or more communication devices such as the transmitters and/or transceivers. In particular, the receiver of the locomotive is adapted to receive one or more communication signals S1, S2 generated by the one or more communication devices and transmitted via the one or more antennas. The one or more communication signals S1, S2 may include, for example, brake pressure data indicating the air brake pressure measured by the pressure sensor. If the one or more communication signals S1, S2 received by the receiver of the locomotive indicate(s) an abnormally low brake pressure, a control unit or operator onboard the locomotive can take corrective action, such as stopping the train system. In this manner, the implementation of the EOT device in the train system may be used by the control unit or operator to detect abnormal brake pressure drops in the air brake hose.

In embodiments of the EOT device 100 having a single antenna, such as the EOT devices shown in FIGS. 2-6, only one communication signal S1 may be transmitted by the antenna and received by the receiver of the locomotive. In embodiments of the EOT device having multiple antennas, such as the EOT devices shown in FIGS. 7-9, the first antenna may transmit a first of the communication signals S1 and the second antenna may transmit a second of the communication symbols S2. In such embodiments, the first antenna may be a primary antenna and the second antenna may be a diversity antenna.

The one or more antennas used in the various embodiments of the EOT device described herein may be selected to obtain desirable communication properties such as length, gain, and/or frequency. For example, the one or more antennas may be ½ wavelength or 1¼ wavelength dipole antennas. In one embodiment, the antenna may be approximately 13 inches long and have a peak gain of approximately 5.1 dBi. These properties of the one or more antennas may be particularly selected based on the distance between the antennas of the EOT device and the receiver of the locomotive in the train system. In one example, the EOT may implement frequency hopping to obtain desirable communication properties. In some embodiments, an ad hoc cellular network may be implemented among the various transceivers, transmitters, and receivers within the train system. For example, a local area network (LAN) can be formed among the communication devices provided on the EOT or provided remotely along a route. The LAN may include software and firmware such as a computer, smart phone, tablet, or other devices capable of wireless communication, each of which may be designated as a wireless base station for a wireless access point within the LAN or ad hoc cellular network. In one example, a wireless mesh network may be formed with a number of radio networks within the range of the EOT. In some examples, ad hoc networks may not require infrastructure hardware such as access points or wireless routers, and may provide a low-cost way of direct communication for the EOT systems. In some examples, the ad hoc network may be a temporary or impromptu network that may have security benefits by making them less vulnerable to outside interference.

Embodiments of the subject matter described herein relate to systems and methods that change characteristics of data signals wirelessly communicated by a communication device of a system, such as an end-of-train (EOT) or end-of-vehicle (EOV) monitoring system. The EOV monitoring system may be transferably coupled with a vehicle system, and may monitor the vehicle system, the route along which the vehicle system moves, or the like. Alternatively, the communication device may be onboard the vehicle in another location, such as a head or leading end of the vehicle or another location. The system includes a housing with a vehicle monitoring device disposed within a cavity of the housing. Additionally or alternatively, the vehicle monitoring device may operate as a vehicle signaling device. The vehicle monitoring device includes a communication device that includes one or more of an antenna, a modem, or the like, that wirelessly communicate data signals. As one example, the communication device may include an antenna that may be an ultra-high frequency antenna, such that the communication device may be able to communicate within a frequency range of about 300 megahertz and about 3 gigahertz. Optionally, the communication device may be an alternative antenna or device that may be capable of communicating in different frequency ranges or at different discrete frequencies. In one example, the communication device can be able to communicate within a frequency range of 220 megahertz and about 450 megahertz. In one example, the communication device can be configured to perform frequency hopping between different discrete frequencies.

The wireless communication device is operably coupled with one or more ground radials or other ground radials that conduct data signals to and/or from the communication device. For example, the communication device may communicate with a controller onboard a vehicle system via a vehicle communication system, may communicate with a controller off-board the vehicle system via an off-board communication system, or the like. The ground radials may form a ground plane of the antenna, such as while the vehicle system is moving, while the antenna is wirelessly communicating the data signals, or the like. Optionally, the ground radials may change one or more characteristics of the data signals wirelessly communicated by the communication device. For example, first ends of the ground radials may be operably coupled with the communication device, and second ends of the ground radials may be disposed a distance away from the communication device and routed to different locations within the housing of the EOV system and/or locations outside of the housing of the EOV system.

Figure 14:
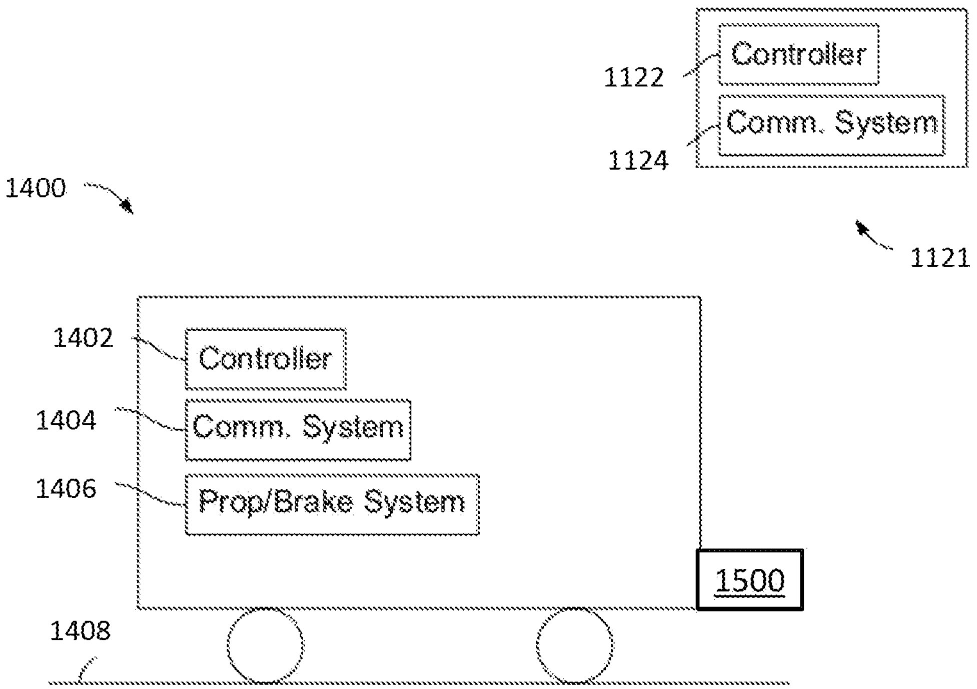
FIG. 14 schematically illustrates a vehicle system in accordance with one embodiment.

In one or more embodiments, the ground radials may be flexible ground radials that may be able to be formed, bent, shaped, or the like, to allow the ground radials to be routed around different components within the housing of the EOV system. Optionally, one or more of the ground radials, or portions of the ground radials, may be rigid structures that may not be able to be bent, shaped, deformed, or the like. Optionally, a portion of one of the ground radials may extend within one of the walls or surfaces of the housing of the EOV system. Optionally, a portion of one of the ground radials may extend outside of the housing of the EOV system. FIG. 14 illustrates a vehicle system 1400 in accordance with one embodiment. The vehicle system can be a rail vehicle system, but optionally can be an automobile, a truck, a bus, a mining vehicle, a marine vessel, aircraft, agricultural equipment or vehicles, or other off-highway vehicle. While some embodiments described herein relate to vehicle systems, not all embodiments of the inventive subject matter are restricted to vehicle systems. One or more embodiments of the inventive subject matter may relate to other types or models of systems, such as mechanical systems, warehouse facilities, power grid components, mining and/or agricultural equipment, or the like. The illustrated vehicle system includes a single vehicle, but optionally can be formed from two or more vehicles that may travel together (by being mechanically coupled and/or by being mechanically separate but communicating with each other to travel together, such as in a convoy). The vehicle system travels along a route 1408, such as tracks, roads, highways, land-based paths, airborne paths, waterways, or the like. Optionally, the vehicle system may include two or more different types of vehicles that may operate as a common vehicle system and that may communicate with each other via the off-board database. For example, the vehicle system may comprise a rail vehicle that may communicate with an unmanned aerial vehicle via the off-board database, or an aircraft that communicates with a marine vessel.

The vehicle system includes a controller 1402, which may be referred to as an onboard controller. The onboard controller can represent hardware circuitry that includes and/or is connected with one or more processors that perform operations described in connection with the onboard controller. The onboard controller can communicate with onboard and/or off-board components via a vehicle communication system 1404. The vehicle communication system can represent transceiving circuitry, one or more antennas, modems, or the like. In one or more embodiments, the vehicle communication system may receive and/or provide data signals to the onboard controller. The vehicle communication system may be the same or similar to other communication devices described herein.

The vehicle system includes a propulsion and brake system 1406 that operates to control movement of the vehicle system along the route. The propulsion and brake system can represent one or more engines, motors, transmissions, propellers, or the like, that generate propulsion to move the vehicle system. The brake system can operate to slow or stop movement of the vehicle system. The brake system can include air brakes, friction brakes, motors (e.g., used for dynamic or regenerative braking), or the like. The onboard controller can communication control systems to the propulsion and brake system to control or change movement of the vehicle system.

In one or more embodiments, the vehicle system may include one or more energy storage devices (not shown) that store and/or generate electric current. This current can be used to power components onboard the vehicle system, such as the propulsion system, a lighting system, or the like. Optionally, the energy storage devices can include or represent one or more motors of the propulsion system and/or the brake system (e.g., where the motors generate current during regenerative braking). The energy storage devices can include one or more batteries, fuel cells, photovoltaic devices, flywheels, alternators, generators, or the like. The onboard controller can communicate control signals to the energy storage devices to control supply of the current to one or more components of the vehicle system.

The onboard controller of the vehicle system may communication with an off-board controller 1122 of an off-board database 1121. The off-board controller can represent hardware circuitry that includes and/or is connected with one or more processors that perform operations of the off-board controller. The off-board database may be disposed at a location along the route, or may be positioned a distance away from the route, such as a database facility. For example, the off-board database may be located such that the vehicle system may be visible to an operator of the off-board database. Alternatively, the off-board database may be disposed in a different county, in a different state, in a different country, or the like, as the vehicle system. In one or more embodiments, the off-board controller can communicate with the onboard controller of the vehicle system to control or restrict movement of the vehicle system. For example, the off-board controller can communicate with the onboard controller of the vehicle system to notify the vehicle system where the vehicle system is allowed to travel, how fast the vehicle system is allowed to travel, or the like. In one example, the onboard controller can wirelessly communicate with the off-board controller on one or more frequencies selected by the off-board controller. In one embodiment, the location of the off-board controller may determine the frequency range for wireless communication. The onboard controller may wirelessly communicate on frequency ranges selected based on previous trips. The onboard controller may associate different frequencies with different locations along the route. In one example, the EOT may be configured to determine which frequencies to use based on location along the route. The EOT may be configured to change frequencies during operation responsive to a change in location along a route. In one embodiment, the off-board controller may determine the frequency range based on the location of the EOT. In some embodiment, the on-board controller may determine the frequency range based on the location of the EOT.

In one embodiment, the off-board database may represent a back-office server of a positive vehicle control (PVC) system. A PVC system is a control system in which a vehicle system is allowed to move, and/or is allowed to move outside a designated restricted manner (such as above a designated penalty speed limit), only responsive to receipt or continued receipt of one or more signals (e.g., received from off-board the vehicle) that meet designated criteria, e.g., the signals have designated characteristics (e.g., a designated waveform and/or content) and/or are received at designated times (or according to other designated time criteria) and/or under designated conditions. This is opposed to 'negative' vehicle control systems where a vehicle is allowed to move unless a signal (restricting movement) is received. The back-office server may be a vital or a non-vital system such that data stored, contained, maintained, communicated between, or the like, may be vital (e.g., protected) and/or non-vital (e.g., non-protected) data. Alternatively, the off-board database may represent another computerized system that communicates with vehicle systems described herein.

In one or more embodiments, a system 1500 may be coupled with the vehicle system. The system may be referred to as an EOT or end-of-vehicle (EOV) device or monitoring system. The EOV monitoring system may monitor the vehicle system and/or the route along which the vehicle system moves. In one or more embodiments, the vehicle system to which the monitoring system is coupled can be referred to as an EOT vehicle or end-of-vehicle (EOV) vehicle. The EOT device or system may be a transferrable device that may be moved from one vehicle to another vehicle that may change the designation of the respective vehicle from which the EOT system is removed, and the other vehicle where the EOT system is moved to may be identified as a new EOT vehicle.

Figure 15:
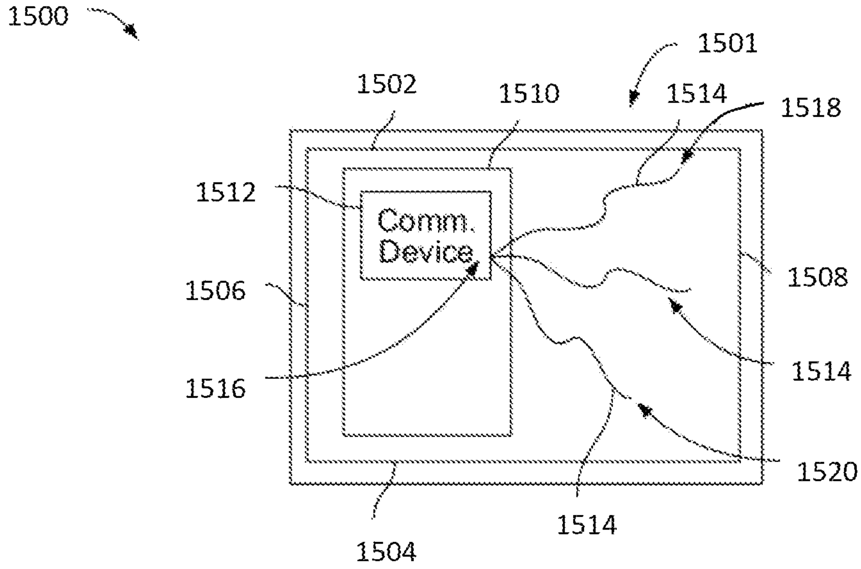
FIG. 15 illustrates a system of the vehicle system shown in FIG. 14 in accordance with one embodiment.

FIG. 15 illustrates the system 1500 or the EOV system in accordance with one embodiment. The EOV system includes a housing 1501 formed by plural surfaces, such as first, second, third, and fourth surfaces 1502, 1504, 1506, 1508, respectively, as illustrated in FIG. 15. The plural surfaces define an enclosure or cavity 1520 such that the cavity is separated from the environment outside of the plural surfaces. One or more of the plural surfaces may be rigid surfaces and may be manufactured and designed to withstand rugged environments. For example, the surfaces may be manufactured of a metal or metallic alloy, a plastic, or other engineered material, such that the shape of the surfaces may remain substantially unchanged responsive to impact or compression forces directed onto the surfaces.

The EOV system includes a vehicle monitoring device 1510 disposed within the cavity of the housing. The vehicle monitoring device includes a wireless communication device 1512 that can represent and/or include transceiving circuitry, one or more antennas, modems, or the like. In one or more embodiments, the wireless communication device of the vehicle monitoring device may receive and/or provide data signals via the antenna to the onboard controller by wirelessly communicating with the vehicle communication system. Optionally, the antenna of the communication device may communicate data signals with the off-board communication system, directly or via the vehicle communication system.

In one or more embodiments, the vehicle system may include plural vehicles operably coupled together, and the EOV system may be coupled with the last vehicle of the vehicle system in the direction of travel of the vehicle system. For example, the EOV system may be positioned at a location out of a direct line of sight with a lead vehicle of the vehicle system. The antenna of the communication device may wirelessly communicate command signals with one or more of the vehicles of the vehicle system. For example, the communication device may communicate data signals with a lead vehicle of the vehicle system and/or the same or different data signals with other vehicles of the vehicle system. The communication device of the vehicle monitoring device may be the same or similar to other communication devices described herein.

In one or more embodiments, the one or more processors of the onboard controller, the off-board controller, and/or the vehicle monitoring device may generate and/or communicate electronic command messages to control operations of the propulsion and brake systems of the vehicle system, to control operations of other vehicles operably coupled with the vehicle system, to control operations of other vehicles mechanically separated from the vehicle system, or the like.

The vehicle system and/or the EOV system may include one or more sensors (not shown), that can detect characteristics of the vehicle system, the vehicle, the monitoring device, and/or the route. For example, the sensors may detect characteristics of the vehicle system such as, but not limited to, if the vehicle system is stationary or moving, operating parameters of the moving vehicle system (e.g., speed, direction, or the like), a geographic location of the vehicle system, or the like. The sensors may detect characteristics of the EOV system such as, but not limited to, a location of the EOV system, a health score or index of the system, or the like. The sensors may detect characteristics of the route such as, but not limited to, identifications, locations, and/or statuses of wayside devices disposed along the route, route gradients, a health status of the route (e.g., blockages, deteriorating conditions, or the like), or the like.

The EOV system includes one or more ground radials 1514 electrically coupled with the communication device. The ground radials conduct the data signals from the communication device, for example data signals communicated to the vehicle communication system, the off-board communication system, or the like. In the illustrated embodiment of FIG. 15, the EOV system includes three ground radials. Each of the ground radials extends from a first end 1516 operably coupled with the communication device, and a second end 1518 disposed a distance away from the communication device. The second end of each of the ground radials is unterminated or unconnected, such as from another electrical device. For example, the second ends of the ground radials may be unterminated to form a ground plane of the antenna of the communication device. The three ground radials are disposed within the cavity of the housing of the EOV system and extend in different directions away from the communication device and toward the first, second, and fourth surfaces 1502, 1504, 1508, respectively, but alternatively may extend in any alternative direction within the cavity.

The ground radials may change a characteristic of the data signals communicated by the communication device. For example, the communication device may be capable of communicating data signals a first distance away from the EOV system without the ground radials, and the communication device may be capable of communicating data signals a longer, second distance away from the EOV system with the ground radials. In one or more embodiments, the communication device may be an ultra-high frequency antenna device that communicates signals having a frequency range of about 300 megahertz and about 3 gigahertz. The communication device may be unable to communicate the data signals within the frequency range of about 300 megahertz and 3 gigahertz without the ground radials, and the ground radials may allow the communication device to communicate the data signals with the onboard controller and/or the off-board controller via the vehicle communication system and/or the off-board communication system, respectively within the ultra-high frequency range. For example, the ground radials may change a strength of the data signals, may change a distance away the data signals may be communicated, or the like.

In one or more embodiments, the ground radials may be referred to as radials, ground radials, ground conductors, or the like. The ground radials form a ground plane of the antenna of the communication device of the vehicle monitoring device. For example, the ground radials may form a conducting surface within the housing of the vehicle monitoring device that receives and/or reflects data signals wireless communicated with the communication device. The placement or position of the different radials may control a size, shape, and/or orientation of the ground plane. Optionally, the size, shape, and/or orientation of the ground plane may be based on the frequency range used by the antenna to communicate the data signals.

In one embodiment, the ground radials may form the ground plane of the antenna within the vehicle monitoring device while the vehicle system is in transit or moving. Optionally, the ground radials may form a ground plane of the antenna while the vehicle system is stationary. Optionally, the ground radials may form the ground plane of the antenna while the antenna is wirelessly communicating data signals between a controller outside of the vehicle monitoring device. In one or more embodiments, the ground radials may change the performance of the communication device of the vehicle monitoring device. For example, the communication device performs to a first standard threshold (e.g., signal strength, clarity, or the like) with the ground radials relative to an EOV system that is devoid ground radials.

In one or more embodiments, one or more of the ground radials may be a flexible ground radial such that a shaped of the flexible ground radial may be defined or based on a location of the flexible ground radial within the cavity of the housing. For example, the ground radial may be a flexible or malleable wire or other conductive material that may be able to bend, deform, or the like, to be positioned around other components of the EOV system (not shown). For example, the shape of the ground radials may be based on the location of the ground radial, based on other components within the cavity, based on a position where the second end of the ground radial is to be located, or the like. In one or more embodiments, an operator of the EOV system may manually flex, bend, deform, reshape, or the like, one or more of the flexible ground radials based on a performance of the communication device, based on a size of the vehicle system (e.g., a number of vehicles of the vehicle system, a distance the data signals may need to wirelessly travel between the EOV system and a lead vehicle, or the like), based on an environment in which the vehicle system moves (e.g., ambient conditions such as temperature, humidity, pressure, or the like; natural geographic conditions such as mountains, forests, valleys, or the like; environments of the route such as bridges, tunnels, buildings, or the like), or the like.

Figure 16:
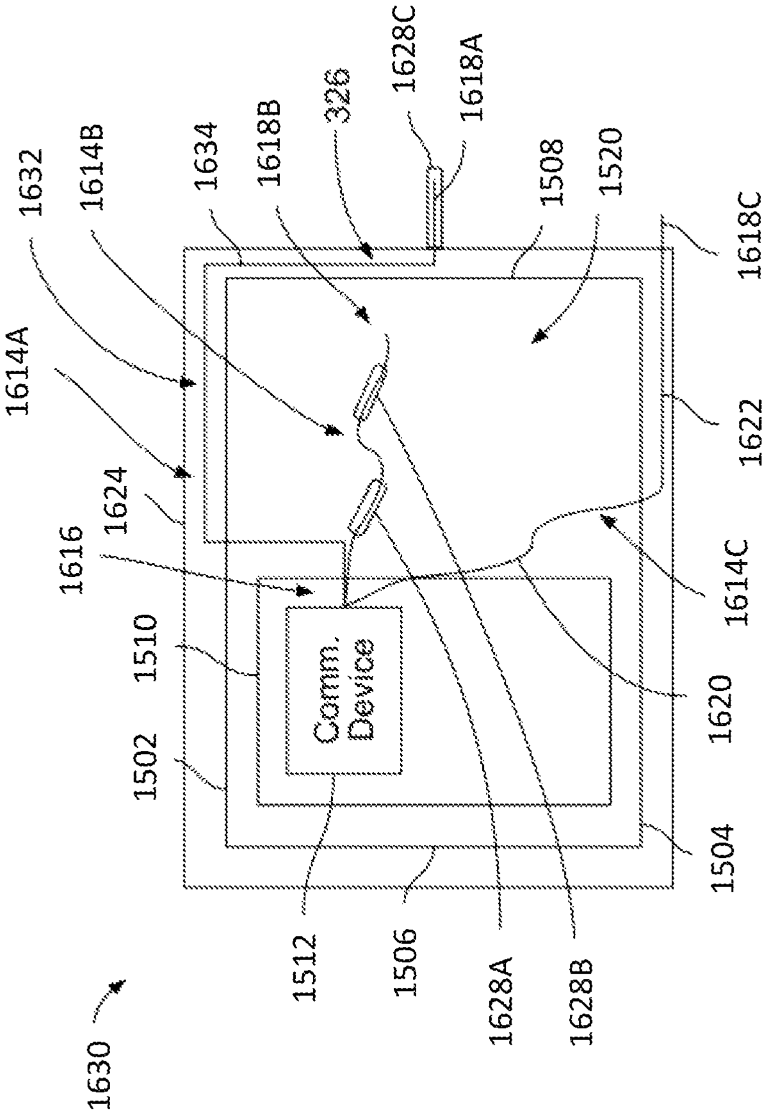
FIG. 16 illustrates a system in accordance with one embodiment.

FIG. 16 illustrates an example of a system 1630 in accordance with one embodiment of the subject matter described herein. Like the system 1500, the system 1630 may also be referred to as an EOV system or EOV monitoring system. The system includes the vehicle monitoring device disposed within the cavity of the housing of the system formed by the plural surfaces.

The communication device of the vehicle monitoring system is operably coupled with plural ground radials 1614. For example, a first end 1616 of each of the ground radials 1614A, 1614B, 1614C is operably coupled with the communication device to communication data signals between the communication device and the vehicle communication system, the off-board communication system, or the like.

In the illustrated embodiment of FIG. 16, a first ground radial 1614A is a rigid ground radial such that the shape of the ground radial may remain substantially unchanged. The first ground radial extends between the first end 1616 and a second end 1618A. A first portion 1632 of the first ground radial extends within the first surface 1502 of the housing, and a second portion 1634 of the first ground radial extends within the fourth surface 1508 of the housing. Optionally, the first ground radial may extend within any one or more surfaces of the housing between the first and second ends of the ground radial. Additionally, the second end of the first ground radial is disposed as a position outside of the housing. In the illustrated embodiment of FIG. 16, the second end extends in a substantially horizontal direction outside of the housing, but alternatively may extend in any one or more directions, and may extend any length outside of the housing.

The EOV system includes a second ground radial 1614B that extends between the first end 1616 and a second end 1618B. The second ground radial may be a flexible ground radial, like the ground radials shown in FIG. 15. For example, the shape or the second ground radial may be based on one or more components (not shown) that the second ground radial needs to be positioned around within the cavity of the housing.

The EOV system includes a third ground radial 1614C that extends between the first end 1616 and a second end 1618C. The third ground radial includes a flexible portion 1620 at a location between the first and second ends, and a rigid portion 1622 between the first and second ends. The flexible portion of the third ground radial is disposed at a first location within the cavity of the housing, and the rigid portion of the third ground radial is disposed at a second location and extends within the second surface 1504 of the housing. For example, the rigid portion of the third ground radial extends within a portion of the second surface of the housing. Like the second end of the first ground radial, the second end of the third ground radial is disposed outside of the housing. In the illustrated embodiment of FIG. 16, the second end of the third ground radial extends in a substantially horizontal direction outside of the housing, but alternatively may extend in any one or more directions, and may extend any length outside of the housing.

One or more of the ground radials may include an insulator or insulator material disposed around an exterior surface of the ground radials. In one or more embodiments, the insulators may be flexible insulators that are wrapped or otherwise disposed around the ground radials such that the insulators may flex or move relative to movement or flexing of the ground radials. In one or more embodiments, the system may include one or more sleeves 1628 that may be disposed around a portion of the one or more ground radials. For example, a portion of the ground radials may extend through the sleeves. The sleeves may be disposed around the insulator of the ground radials, or may be coupled directly with an exterior surface of the ground radial. In the illustrated embodiment of FIG. 16, two sleeves 1628A, 1628B are disposed over two portions of the flexible second ground radial between the first and second ends of the second ground radial. Additionally, a single sleeve 1628C is disposed over the second end of the first ground radial that extends outside of the housing. For example, the sleeve 1628C and the second end of the first ground radial are disposed outside of the housing.

The sleeves may change a durability of the portion of the ground radial that extends within the sleeve. For example, the portion of the ground radial that extends or is disposed within the sleeve may be a flexible ground radial, and the sleeve may prohibit the shape of the portion of the flexible ground radial to be changed or deformed. Optionally, the portion of the ground radial that extends within the sleeve may be a rigid ground radial, and the sleeve may increase a rigidity or hardness of the ground radial, such as to provide additional protection to the rigid ground radial. Optionally, the system may include any number of sleeves, that may be disposed over any portion of the one or more ground radials within and/or outside of the housing. Optionally, the insulator may provide durability to the ground radials, and the sleeves may provide additional durability to the insulator and the ground radials that the insulator may be unable to provide directly. For example, the sleeves may be disposed at a location along the ground radial that may need or require reinforced protection.

In accordance with one embodiment, an end-of-train (EOT) device may have an enclosure having walls that enclose an interior volume; a communication device disposed in the interior volume of the enclosure; and an antenna coupled with the communication device and configured to wirelessly communicate signals with the communication device, the antenna may be coupled to one or more of inner surfaces of the walls of the enclosure that face the interior volume, embedded within one or more of the walls of the enclosure, or embedded within an exterior handle of the enclosure. In one example, the walls of the enclosure can have a thickness between the inner surfaces of the walls and exterior surfaces of the walls, and the antenna can be embedded within one or more of the walls between the inner surfaces and the exterior surfaces of the one or more of the walls. In one example, the antenna can be coupled with the inner surfaces of the walls of the enclosure inside the interior volume of the enclosure. In one example, the enclosure can be sized such that a longest interior dimension of the interior volume of the enclosure may be shorter than a length of the antenna. In one example, the antenna may extend from the interior volume of the enclosure into the exterior handle of the enclosure. In another example, the EOT device may have a brake conduit coupled with the enclosure, wherein the antenna can also extend into the brake conduit.

In accordance with one embodiment, a device can be adapted for attachment to a coupler of a trailing railcar of a train, the device can have an enclosure defining an internal compartment; a port may be adapted for connection to an air brake hose receiving air from a brake pipe of the train; a communication device may be disposed within the internal compartment of the enclosure; and at least one antenna can be connected to the communication device and disposed in at least a portion of the enclosure or in at least a portion of the air brake hose connected to the port. In one example, the at least one antenna can have at least one of a monopole antenna or a dipole antenna. In one example, the at least one antenna can have a first primary antenna and a second diversity antenna. In one example, the communication device may have a first communication device connected to the first primary antenna and a second communication device connected to the second diversity antenna. In one example, the enclosure can have at least one sidewall defining an internal cavity, and the at least one antenna can be at least partially disposed in the internal cavity of the at least one sidewall. In one example, the at least one sidewall of the enclosure can define a channel connecting the internal cavity of the sidewall to the internal compartment of the enclosure, and the at least one antenna can extend through the channel of the at least one sidewall into the internal cavity of the at least one sidewall. In one example, a flexible wall of the air brake hose can define an internal cavity in the air brake hose, and the at least one antenna can be at least partially disposed in the internal cavity of the air brake hose. In one example, the port can define a channel connecting the internal cavity of the air brake hose to the internal compartment of the enclosure, and the at least one antenna can extend through the channel of the port into the internal cavity of the air brake hose. In another example, the enclosure can have at least one sidewall defining an internal cavity, and wherein the at least one antenna can be adhered to the internal cavity of the at least one sidewall.

In accordance with one embodiment, a method may include wirelessly communicating data signals from one or more transceivers of a wireless communication device of a vehicle monitoring device, the vehicle monitoring device can be configured to be disposed within a housing operably coupled with a vehicle system, the wireless communication device can be configured to wirelessly communicate the data signals with a controller disposed outside of the housing; and transmitting data signals on discrete frequency ranges using the one or more transceivers based at least in part on a frequency selected by the controller disposed outside of the housing. In one example, wirelessly communicating data signals can include transmitting and receiving a plurality of data signals using a high frequency antenna disposed within the housing. In one example, the method may include selecting between different frequency ranges based at least in part on a location of the controller. In one example, the controller can be positioned at a location off-board of the vehicle system. In one example, the frequency ranges can be more than 220 megahertz and less than 3 gigahertz.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

While several examples of EOT devices and an implementation of the same in a train system are shown in the accompanying figures and described in detail hereinabove, other examples will be apparent to and readily made by those skilled in the art without departing from the scope and spirit of the present disclosure. For example, it is to be understood that aspects of the various embodiments described hereinabove may be combined with aspects of other embodiments while still falling within the scope of the present disclosure. Accordingly, the foregoing description is intended to be illustrative rather than restrictive. The assembly of the present disclosure described hereinabove is defined by the appended claims, and all changes to the disclosed assembly that fall within the meaning and range of equivalency of the claims are to be embraced within their scope.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. An end-of-train (EOT) device, comprising:

an enclosure having walls that enclose an interior volume;

a communication device disposed in the interior volume of the enclosure; and an antenna coupled with the communication device and configured to wirelessly communicate signals with the communication device from a trailing rail vehicle of a rail vehicle system to another rail vehicle of the rail vehicle system, the antenna embedded within one or more of:

one or more of the walls of the enclosure,
an exterior handle of the enclosure, or
a combination thereof.

2. The EOT device of claim 1, wherein the walls of the enclosure have a thickness between inner surfaces of the walls and exterior surfaces of the walls, and the antenna is embedded within one or more of the walls between the inner surfaces and the exterior surfaces of the one or more of the walls.

3. The EOT device of claim 1, wherein the enclosure is sized such that a longest interior dimension of the interior volume of the enclosure is shorter than a length of the antenna.

4. The EOT device of claim 1, wherein the antenna extends from the interior volume of the enclosure into the exterior handle of the enclosure.

5. The EOT device of claim 1, further comprising a brake conduit coupled with the enclosure, wherein the antenna also extends into the brake conduit.

6. A device comprising:
an attachment to couple to a coupler of a trailing railcar of a train;
an enclosure defining an internal compartment;
a port adapted for connection to an air brake hose receiving air from a brake pipe of the train;
a communication device disposed within the internal compartment of the enclosure; and
at least one antenna connected to the communication device and disposed in at least a portion of the air brake hose connected to the port, wherein a flexible wall of the air brake hose defines an internal cavity in the air brake hose, and wherein the at least one antenna is at least partially disposed in the internal cavity of the air brake hose.

7. The device of claim 6, wherein the at least one antenna comprises at least one of a monopole antenna or a dipole antenna.

8. The device of claim 6, wherein the at least one antenna comprises a first primary antenna and a second diversity antenna.

9. The device of claim 8, wherein the communication device comprises a first communication device connected to the first primary antenna and a second communication device connected to the second diversity antenna.

10. The device of claim 6, wherein the enclosure comprises at least one sidewall defining an internal cavity, and wherein the at least one antenna is at least partially disposed in the internal cavity of the at least one sidewall.

11. The device of claim 10, wherein the at least one sidewall of the enclosure defines a channel connecting the internal cavity of the sidewall to the internal compartment of the enclosure, and wherein the at least one antenna extends through the channel of the at least one sidewall into the internal cavity of the at least one sidewall.

12. The device of claim 6, wherein the port defines a channel connecting the internal cavity of the air brake hose to the internal compartment of the enclosure, and wherein the at least one antenna extends through the channel of the port into the internal cavity of the air brake hose.

13. The device of claim 6, wherein the enclosure comprises at least one sidewall defining an internal cavity, and wherein the at least one antenna is adhered to the internal cavity of the at least one sidewall.

14. A method comprising:
wirelessly communicating data signals from one or more transceivers of a wireless communication device of a vehicle monitoring device, the vehicle monitoring device configured to be disposed within a housing operably coupled with a vehicle system, the wireless communication device configured to wirelessly communicate the data signals with a controller disposed outside of the housing; and
transmitting the data signals on a selected frequency range from a plurality of discrete frequency ranges using the one or more transceivers, wherein the selected frequency range is based at least in part on a selection from the plurality of discrete frequency ranges by the controller disposed outside of the housing.

15. The method of claim 14, wherein wirelessly communicating the data signals comprises transmitting and receiving a plurality of data signals using a high frequency antenna disposed within the housing.

16. The method of claim 15, further comprising selecting between different frequency ranges based at least in part on a location of the controller.

17. The method of claim 16, wherein the controller is positioned at a location off-board of the vehicle system.

18. The method of claim 17, wherein the plurality of discrete frequency ranges are more than 220 megahertz and less than 3 gigahertz.

* * * * *